April 26, 1960
E. GRZESNIKOWSKI
2,934,034
PROPELLER SHAFT STRUT FOR MOTORBOATS
Filed Oct. 30, 1957
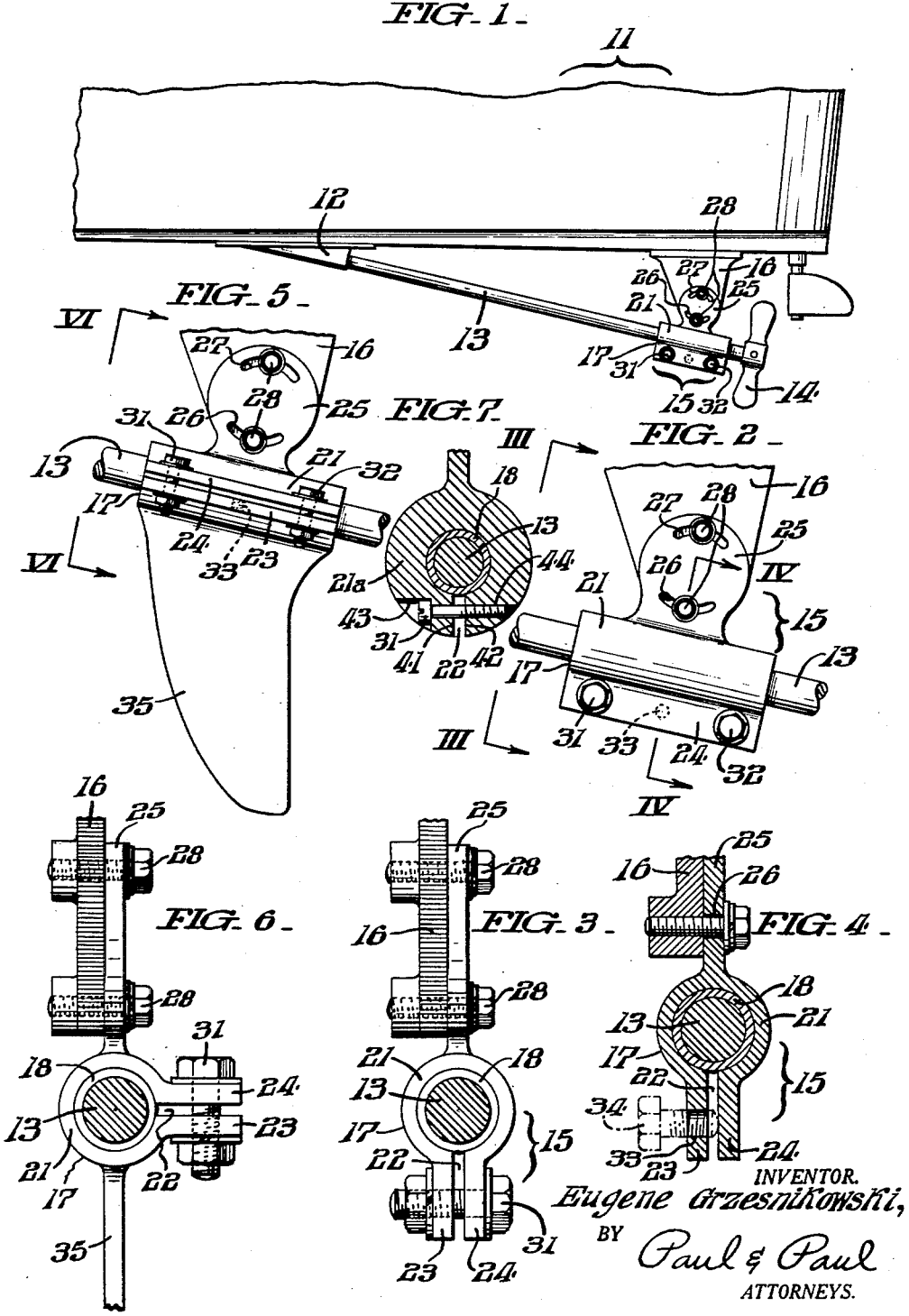
INVENTOR.
Eugene Grzesnikowski,
BY
Paul & Paul
ATTORNEYS.

United States Patent Office 2,934,034
Patented Apr. 26, 1960

2,934,034
PROPELLER SHAFT STRUT FOR MOTORBOATS

Eugene Grzesnikowski, Croydon, Pa., assignor to Samuel Jackson's Sons, Inc., Philadelphia, Pa., a corporation of Delaware Application October 30, 1957, Serial No. 693,473

4 Claims. (Cl. 115—34)

This invention relates to improvements in a propeller shaft strut for motorboats and more particularly concerns improvements in the housing of a propeller shaft strut.

Struts are fixed to the bottom of motorboats and are used to rotatably support a propeller shaft. Such struts include a housing which holds a bearing. This bearing is subject to wear and must be replaced from time to time. Heretofore, to replace the bearing, the strut had to be removed and taken to a shop. At the shop, removal of the bearing was still very laborious and it generally required half a day to tap the bearing out of the housing and replace it with a new one.

Accordingly, an object of this invention is to overcome the aforementioned difficulties. Another object of this invention is to provide an improved propeller shaft strut wherein the strut bearing is quickly and easily removable. Another object is to provide a propeller shaft strut and housing wherein the strut bearing may be replaced in the water.

Other objects and advantages of this invention will further become apparent hereinafter and in the drawings, whereof:

Fig. 1 represents a partial view in side elevation of the bottom portion of a motorboat;

Fig. 2 represents an enlarged view of the propeller shaft strut of Fig. 1 constructed in accordance with this invention;

Fig. 3 represents a view in section taken as indicated by the lines and arrows III—III which appear in Fig. 2;

Fig. 4 represents a view in section taken as indicated by the lines and arrows IV—IV which appear in Fig. 2;

Fig. 5 represents a view in side elevation of another embodiment of the invention; and Fig. 6 represents a view in section taken as indicated by the lines and arrows IV—IV which appear in Fig. 5.

Fig. 7 represents a view in section similar to Fig. 4, of another embodiment of the invention.

Although specific terms are used for clarity in the following description, these terms are intended to refer only to the structure shown in the drawings and are not intended to define or limit the scope of the invention.

Turning now to the specific embodiment of the invention selected for illustration in the drawings, the number 11 designates generally a motorboat which is provided with a stuffing box 12 through which a propeller shaft 13 extends from the engine to a propeller 14. Propeller 14 is supported near its propeller end by an adjustable strut 15.

Adjustable strut 15 comprises a strut bracket 16 which is fixed to the bottom of the boat, a strut housing 17, and a strut bearing 18 which is generally made of marine babbitt metal, cutless rubber or the like, and must be replaced from time to time because of wear.

Strut housing 17 includes a cylindrical body 21 having a longitudinal slot 22 formed therein. Extending from the edges of slot 22 are a pair of substantially parallel flanges 23 and 24. Also extending from body 21 is a connecting tongue 25 which has formed therein a pair of curved slots 26 and 27. Bolts 28 anchor tongue 25 to strut bracket 16, and the curved slots 26, 27 provide for adjusting the relative position of housing 17 and bracket 16. Flanges 23, 24 are provided with holes which receive bolt, nut and washer assembly 31, 32, which, as shown in Fig. 3, urges flanges 23, 24 together to lock bearing 18 without housing 17. Flange 23 is also provided with a tapped hole 33. To remove bearing 18 from housing 17, a bolt 34 is turned into tapped hole 33 with the nose of the bolt bearing against flange 24 to spread flanges 23, 24 apart.

Figs. 5 and 6 show another embodiment of the invention wherein a fin-like propeller guard 35 depends from body 21. It will be noted that in this embodiment flanges 23 and 24 extend in a horizontal direction away from body 21 whereas in the embodiment of Figs. 1–4, flanges 23, 24 extend downwardly.

Fig. 7 is a view similar to Fig. 4, showing another embodiment of the invention wherein cylindrical body 21a is built up to such a thickness that slot 22 is defined by oppositely-facing, substantially parallel shoulders 41, 42 instead of by the parallel flanges 23, 24. Body 21a is provided with recess 43 and tapped hole 44 which receives the bolt 31. This construction has the advantage of smoothing the flow of water which passes body 21a and impinges upon the propeller 14.

In operation, the rotation of propeller shaft 13 causes bearing 18 to wear and need replacement. Such replacement is an easy matter: propeller 14 is removed from shaft 13, bolt 34 is turned into tapped hole 33 to spread apart flanges 23, 24 (as shown in Fig. 4), and bearing 18 is removed and replaced by a new bearing.

It will be apparent that various modifications may be made in the form of the strut, including variations in the outside shape of the housing body. Further, the invention comprehends the substitution of equivalent parts for those herein disclosed, and the reversal and rearrangement of elements for similar, or analogous purposes. For example, the tongue may serve as one of the flanges. The invention is not limited in scope except as expressly indicated in the claims.

Having thus described my invention, I claim:

1. A propeller shaft strut for boats comprising a strut bracket depending from the bottom of a boat, a strut housing connected to the strut bracket, said strut housing including a cylindrical body having a longitudinal slot formed therein, a pair of oppositely-facing, substantially parallel shoulders formed by the slot, removable bearing means positioned within said body and rotatably supporting a propeller shaft, means normally urging the shoulders together to securely hold the bearing means within the housing, and bearing removal means to spread said shoulders away from each other to release the bearing means from the housing.

2. A propeller shaft strut for motor boats comprising a strut bracket depending from the bottom of a boat, a strut housing connected to the strut bracket, said strut housing including a cylindrical body having a longitudinal slot formed therein, a pair of flanges extending in substantially parallel relationship from the edges of said slot, removable bearing means positioned within said body and rotatably supporting a propeller shaft, means normally urging the flanges together to securely hold the bearing means within the housing, and bearing removal means to spread said flanges away from each other to reelase the bearing means from the housing.

3. A propeller shaft strut for motor boats comprising a strut bracket depending from the bottom of a boat, a strut housing adjustably connected to the strut bracket, said strut housing including a cylindrical body having a longitudinal slot formed therein, a pair of flanges extending in substantially parallel relationship from the edges of said slot, removable bearing means positioned within said body and rotatably supporting a propeller shaft, means normally urging the flanges together to securely hold the bearing means within the housing, and bearing removal means wherein one of said flanges is provided with a tapped hole, and bolt means received by said tapped hole to bear against the inner surface of the other flange to spread apart the flanges and release the bearing means from the housing.

4. A propeller shaft strut for motor boats comprising a strut bracket depending from the bottom of a boat, a strut housing adjustably connected to the strut bracket, said strut housing including a cylindrical body having a longitudinal slot formed therein, a propeller guard integrally formed with and depending from said body, a pair of flanges extending in substantially parallel relationship from the edges of said slot, removable bearing means positioned within said body and rotatably supporting a propeller shaft, means normally urging the flanges together to securely hold the bearing means within the housing, and bearing removal means to spread said flanges away from each other to release the bearing means from the housing.

References Cited in the file of this patent

UNITED STATES PATENTS

| | | |
|---|---|---|
| 1,529,897 | List | Mar. 17, 1925 |
| 1,804,882 | Longstreet | May 12, 1931 |
| 1,869,977 | Modin | Aug. 2, 1932 |

FOREIGN PATENTS

| | | |
|---|---|---|
| 9,058 | Great Britain | May 31, 1889 |

UNITED STATES PATENT OFFICE
CERTIFICATE OF CORRECTION

Patent No. 2,934,034            April 26, 1960

Eugene Grzesnikowski

It is hereby certified that error appears in the printed specification of the above numbered patent requiring correction and that the said Letters Patent should read as corrected below.

Column 1, line 50, for "IV-IV" read -- VI-VI --; column 2, line 8, for "without" read -- within --; line 67, for "reelase" read -- release --.

Signed and sealed this 20th day of September 1960.

(SEAL)
Attest:

KARL H. AXLINE
Attesting Officer

ROBERT C. WATSON
Commissioner of Patents